United States Patent Office 3,124,048
Patented Mar. 10, 1964

3,124,048
PHOTOGRAPHIC CAMERA WITH AUXILIARY ELECTRIC LIGHT SOURCE HAVING ENERGIZING CIRCUIT INCLUDING EXPOSURE METER INDICATOR
Paul Greger and Erwin Doring, Braunschweig, Germany, assignors to Voigtländer A.G., Braunschweig, Germany, a corporation of Germany
Filed June 27, 1962, Ser. No. 205,703
11 Claims. (Cl. 95—10)

This invention relates to photographic cameras having an exposure meter and an auxiliary light source either permanently or disengageably connected with the camera, and in which the exposure meter as an indicator scale which is divided into a first range of ambient illumination values adequate for the possible time-diaphragm combinations of the camera and a consecutive second range of ambient illumination values inadequate for possible time-diaphragm combinations of the camera. More particularly, the present invention is directed to novel switching arrangements whereby the indicator of the exposure meter, when it moves into the second range of ambient illumination values, operates as part of an electric device to condition an energizing circuit for activating the auxiliary light source upon release of the camera shutter, and preferably with the luminous value of the light source being dependent upon the position of the indicator within such second range.

It has been proposed to provide photographic cameras of this type in which the exposure meter indicator, when it moves into the second range of exposure values inadequate for the possible time-diaphragm combinations of the camera, actuates or closes a suitable switch in the energizing circuit for the auxiliary light source so that the light source may be energized either directly, by closure of the switch, or indirectly through transfer of a relay energized by closure of the switch, and either immediately upon closure of this switch or upon later actuation of a further switch which is closed by release of the camera shutter and which completes the energizing circuit for the auxiliary light source, again either directly or through the intermediary of a relay.

The present invention is directed to an improved arrangement of this type wherein the exposure meter indicator itself is electrically conductive and serves as a switch closer contact or current conductor for the switching device included in the second range of the exposure meter indicator scale. Thus, for example, a contact means may be mounted in the second range of the exposure meter indicator scale in such a manner that, when the indicator enters this second range, it will engage this contact means, with the contact means being connected to one terminal of either the light source or a source of energy and the exposure meter indicator being connected to the opposite terminal of either the light source or of the source of energy, the light source and the source of energy being otherwise connected in series with each other.

Alternatively, two radially spaced and radially aligned concentric arcuate contact means may be mounted within the range of illumination inadequate for possible time-diaphragm combinations, one contact means being connected with one terminal of the auxiliary light source or of the source of potential, and the other contact means being connected with the other terminal of the auxiliary light source or of the source of potential. Thereby, when the electrically conductive indicator bridges these two contact means, a circuit is closed including the auxiliary light source and the source of potential, such as a battery. In this arrangement, the exposure meter indicator may have a clamping means, such as a clamping yoke, associated therewith to press it against the contact means when the exposure meter indicator is within the second range of the indicating scale. Such clamping means may be activated for example, responsive to operation of the shutter release of the camera.

As a further feature, these spaced contact means may be in the form of resistances included in the energizing circuit of the auxiliary light source. Thereby, and in dependence with the position of the exposure meter indicator when it is pressed against the contact means by the clamping yoke or the like, a resistance which is proportional to the indicator deflection, is cut into the energizing circuit for the auxiliary light source. Thus, the auxiliary light source can be energized with a variable intensity depending, in inverse proportion, upon the ambient light value when the exposure meter indicator is within the range of inadequate ambient light for possible time-diaphragm combinations. In this arrangement, the exposure meter indicator can be connected with one terminal and a single contact means, in the form of a voltage divider, be connected to the other terminal so that the value of the resistance cut into the energizing circuit of the auxiliary light source, when the latter is completed by engagement of the indicator with the additional contact means, can be varied in correspondence with the position of the indicator.

The contact means may be in the form of a plurality of individual contacts so arranged that the exposure meter indicator will always engage only a single contact. In this arrangement, the contacts can be devised as stepwise or serrated surfaces with apices pointing toward the exposure meter and separated by intervening troughs. On one sloping surface of each contact, a dielectric insert is included in such a manner that the exposure meter, when pressed against such surface by a clamping yoke, will always slide over the dielectric insert and engage in the depression or hollow of a contact surface. Thus, when the exposure meter indicator engages the apex of a contact, only a single contact is engaged and, when the exposure meter indicator slides inwardly from such apex, only a different single contact is engaged.

As still a further feature, two contact means can be subdivided into a number of individual contacts so that the exposure meter indicator forms a bridge between individual contacts, with the two contact means being staggered, with respect to the separation between successive contacts, so that at least two individual contacts will be engaged with the exposure meter indicator in any position thereon in the range of inadequate ambient illumination.

For an understanding of the principles of the invention, reference is made to the following description of typical embodiments as illustrated in the accompanying drawings. In the drawings.

Figure 1:
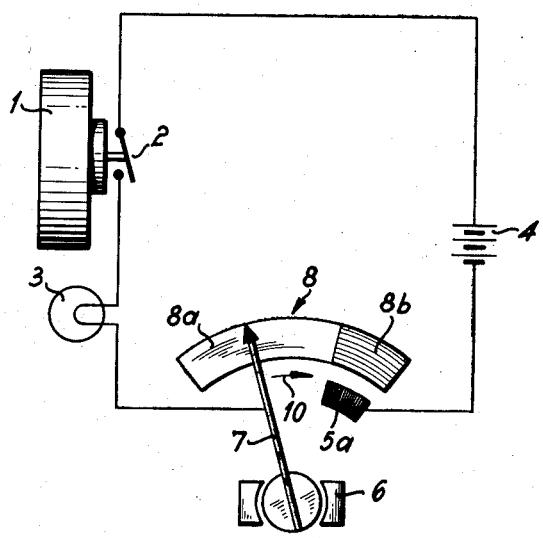
FIG. 1 is a schematic wiring diagram illustrating one embodiment of the invention.

Referring to FIG. 1, a camera shutter 1 is schematically illustrated as controlling a normally open switch 2 which is closed whenever the shutter 1 is released. Switch 2 is connected in series in an energizing circuit for an auxiliary light source 3, which latter is arranged to be energized from a suitable source of potential such as a battery 4. Thus, one terminal of battery 4 is connected to one side of the switch 2, and the other terminal of battery 4 is connected to an arcuately elongated contact 5a.

Contact 5a is associated with the indicator 7 of a moving coil type of exposure meter indicator 6. Indicator 7 is arranged to move over a scale 8 indicating values of ambient illumination. Scale 8 is divided into a first range 8a, of ambient illumination values which are adequate for the possible time-diaphragm combinations of the camera, and a succeeding range 8b of ambient illumination values which are inadequate for possible time-diaphragm combinations of the camera. The arcuate contact 5a is oriented with the range 8b so that, when the exposure meter indicator 7 moves into this range, it will overlie the range 8b as well as the contact 5a.

The indicator 7 is electrically conductive so that, when it moves in the direction of the arrow 10 into the range 8b, it will engage the contact 5a to complete the circuit from the battery 4 to the auxiliary light source 3. Thereby, upon release of shutter 1, the energizing circuit for the auxiliary light source 3 is closed and the latter is activated. Light source 3 may be a flashlight device or any other type of suitable auxiliary light source.

Preferably, the contact surface 5a is of a self-locking nature so that, when it is contacted by the indicator 7, the energizing circuit for the auxiliary light source 3 is maintained even though the indicator 7 may swing back into the range 8a due to the additional illumination of the light source 3 effective upon the exposure meter. Furthermore, the engagement of the electrically conductive indicator 7 with the contact 5a may complete a direct energizing circuit for the light source 3 or may complete an energizing circuit for a relay which is included in the energizing circuit for the light source, thereby reducing the current flow through the indicator 7.

Figure 2:
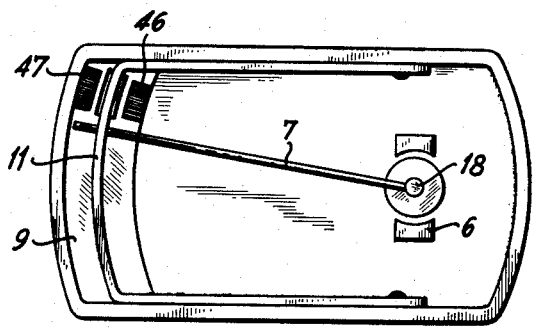
FIG. 2 is a plan view of another embodiment of the invention wherein the exposure meter indicator is pressed against a clamping surface by means of a clamping yoke.

In the embodiment of the invention shown in FIG. 2, whose electric circuitry is similar to that shown in FIG. 1, the exposure meter indicator 7 is arranged to be pressed against a clamping surface 9 by a clamping yoke 11 which may be triggered upon operation of the shutter release of the camera. In this instance, and within the range 8b of inadequate ambient illumination, two concentric and radially spaced arcuate contact means 46 and 47 are provided, these contact means being concentric with the shaft 18 of the indicator 7. When the shutter release is operated, clamping yoke 11 presses the exposure meter indicator 7 toward the clamping surface 9. If the indicator 7 is within the range of inadequate ambient illumination for possible time-diaphragm combinations, the clamping of the indicator 7 against the surface 9 will cause the electrically conductive indicator 7 to interconnect the contact means 46 and 47. Thus, in this example, the electrically conductive indicator 7 acts as a bridge between the two contact means 46 and 47. This embodiment of the invention is particularly suited where the additional light source is in the nature of a flashlight device.

Figure 3:
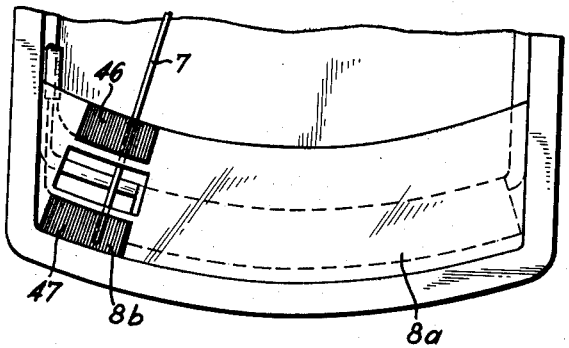
FIG. 3 is a partial plan view, corresponding essentially to FIG. 2, but illustrating the contact surfaces in the form of resistances.

The arrangement of FIG. 3 differs from that of FIG. 2 in that the contact means 46 and 47 are designed as resistances. Thereby, a resistance, having a value in dependence upon the particular position of the indicator 7 in the range of inadequate ambient illumination, is incorporated into the energizing circuit of the light source 3 when the indicator 7 is pressed against the contact means 46 and 47 by the clamping yoke 11. Thus, the resistances 46 and 47 may vary the luminosity of an electronic light source. While the contact means 46 and 47 are illustrated as resistances, it should be understood that contact means 46 and 47 may be any type of impedance such as, for example, capacitances or even inductances.

Figure 4:
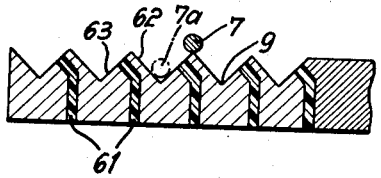
FIG. 4 is a sectional view illustrating a contact arrangement involving contacts arranged in stepwise formation and separated by dielectric inserts.

FIG. 4 illustrates another arrangement whereby varying resistances or capacitances may be cut into the energizing circuit of the light source when the indicator 7 is moving within the range of inadequate ambient illumination, and in accordance with the position of the indicator 7 within such range. To this end, the clamping surface 9 comprises individual contacts 62 and 63 forming a serrated contact surface with alternating apices and troughs. The contacts 62 and 63 are electrically isolated by dielectric inserts 61 positioned in corresponding sloping surfaces of each contact. Thereby, in each position, the indicator 7 will engage only a single contact.

It is possible that the indicator 7 may be clamped against one of the apices. In such case, the indicator 7 will be in electrical connection with the contact whose apex is thus engaged. However, if the indicator 7 is displaced only slightly from such apex, the clamping action will force the indicator 7 to move inwardly into the adjacent trough, as indicated at 7a. In so doing, the indicator 7, if moved to the position 7a of FIG. 4, will slide over the dielectric insert 61 so that it will then be in contact with the contact 62 adjacent the one illustrated as having the indicator 7 resting against its apex.

Figure 5:
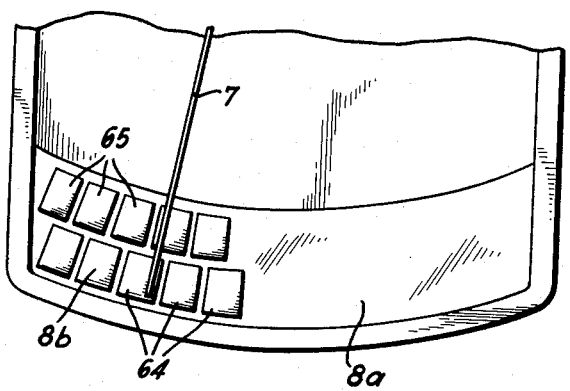
FIG. 5 is a partial plan view illustrating two sets of contacts arranged along radially spaced concentric arcs, with the contacts of the two sets being staggered arcuately with respect to each other.

In the arrangement shown in FIG. 5, sets of contacts 64 and 65 are arranged along radially spaced concentric arcs which are concentric with the axis of rotation of the indicator 7. It will be noted that the contacts 65 are staggered arcuately by the angular width of one-half a contact from the contacts 64. Thereby, indicator 7 will always span at least two contacts. In this arrangement, it is possible, using appropriate electrical circuits, to cut resistance or capacitance in and out of the circuit as desired.

While specific embodiments of the invention have been shown and described in detail to illustrate the application of the principles of the invention, it will be understood that the invention may be embodied otherwise without departing from such principles.

What is claimed is:

1. A photographic camera comprising, in combination, a scene illuminating electric light source operatively associated with said camera; an exposure meter including an indicator movable relative to a scale having consecutive first and second ranges, the first range representing values of ambient light adequate within the range of possible time-exposure combinations of the camera, and the second range representing values of ambient light inadequate within the range of possible time-exposure combinations of the camera; said indicator being electrically conductive; an energizing circuit for said source open at a normally open switch device; said switch device including said indicator and contact means extending along said second range and engaged by said indicator, when in said second range, to close said switch device.

2. A photographic camera comprising, in combination, a scene illuminating electric light source operatively associated with said camera; an exposure meter including an indicator movable relative to a scale having consecutive first and second ranges, the first range representing values of ambient light adequate within the range of possible time-exposure combinations of the camera, and the second range representing values of ambient light inadequate within the range of possible time-exposure combinations of the camera; a series energizing circuit for said light source open at a pair of terminals; said indicator being electrically conductive and connected to one of said terminals; and a contact means extending through said second range and connected to the other of said terminals; said contact means being engageable by said indicator when the latter moves in said second range to electrically interconnect said terminals.

3. A photographic camera, as claimed in claim 2, wherein said energizing circuit is the energizing circuit of a relay having contacts controlling an energizing circuit for said light source.

4. A photographic camera, comprising, in combination, a scene illuminating electric light source operatively associated with said camera; an exposure meter including an indicator movable relative to a scale having consecutive first and second ranges, the first range representing values of ambient light adequate within the range of possible time-exposure combinations of the camera, and the second range representing values of ambient light inadequate within the range of possible time-exposure combinations of the camera; a pair of contact means arranged in spaced relation and extending along said second range; an energizing circuit for said source having a pair of terminals, one connected to one of said contact means and the other connected to the other of said contact means, whereby said energizing circuit is open at said contact means; said indicator being electrically conductive and being arranged to engage and bridge said contact means, when said indicator moves into said second range, to electrically interconnect said terminals.

5. A photographic camera, as claimed in claim 4, including a clamping yoke arranged to engage said indicator and clamp the same against a clamping surface; said clamping yoke, when said indicator is in said second range, pressing said indicator against said contacts to electrically bridge the same.

6. A photographic camera, as claimed in claim 5, wherein said indicator is pivotal about an axis and said scale is arcuate and concentric with said axis; said contacts being arcaute and concentric with the pivot axis of said indicator, and being spaced radially from each other; said contacts comprising wound resistances each connected at a corresponding end to said energizing circuit; whereby, when said indicator is pressed against said contacts by said clamping means, when said indicator is in said second range, the resistance included in said energizing circuit will correspond to the position of said indicator within said second range.

7. A photographic camera, as claimed in claim 6, wherein the ends of said resistances adjacent the outer end of said second range are connected to said energizing circuit, so that the resistance included in said energizing circuit, upon engagement of said indicator with said contacts to bridge the same, will be inversely proportional to the value of the ambient light as indicated by the position of said indicator within said second range.

8. A photographic camera, as claimed in claim 1, wherein said contact means is in the form of a wound resistance connected in said energizing circuit as a voltage divider; whereby the amount of resistance included in said energizing circuit when said indicator moves into said second range to electrically engage said contact means is a function of the position of said indicator within said second range.

9. A photographic camera, as claimed in claim 1, wherein said contact means comprises plural adjacent contacts successively engageable by said indicator in accordance with the deflection of the latter; and impedances of different values connected to respective contacts, whereby the impedance included in said energizing circuit upon engagement of said indicator with a contact is a function of the deflection of said indicator.

10. A photographic camera, as claimed in claim 9, wherein the surface of said contact means facing said indicator is serrated so that said contact means presents alternating apices and troughs; and dielectric material inserted in corresponding sloping faces of each of said contact means to divide said contact means into individual electrically isolated; whereby, when the indicator engages an apex of said contact means, only one contact is electrically connected to said indicator and, when said indicator is displaced slightly from an apex, it will move into the nearest adjacent trough, again to engage only one contact.

11. A photographic camera, as claimed in claim 4, wherein each of said contact means comprises plural successive and isolated contacts successively engageable by said indicator in accordance with the deflection of the latter; the contacts of one contact means being staggered longitudinally relative to the contacts of the other contact means by substantially the width of one contact, so that the indicator will always engage at least one contact of each of said contact means.

References Cited in the file of this patent

UNITED STATES PATENTS

| | | |
|---|---|---|
| 2,297,262 | Tonnies | Sept. 29, 1942 |
| 2,978,970 | Fahlenberg | Apr. 11, 1961 |
| 3,003,389 | Stimson | Oct. 10, 1961 |
| 3,023,665 | Estes | Mar. 6, 1962 |
| 3,041,949 | Buhrle | July 3, 1962 |
| 3,043,203 | Buhrle | July 10, 1962 |
| 3,044,377 | Gebele | July 17, 1962 |